United States Patent
Gwinn et al.

(12) 
(10) Patent No.: US 6,234,905 B1
(45) Date of Patent: May 22, 2001

(54) ELASTOMERIC COUPLING AND METHOD OF IMPROVING DURABILITY THEREOF

(75) Inventors: James T. Gwinn, Fairview; George M. Klapsinos, Erie, both of PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/074,915

(22) Filed: May 8, 1998

(51) Int. Cl.⁷ ...................................................... F16D 3/52
(52) U.S. Cl. .............................................................. 464/75
(58) Field of Search ................................. 464/73, 74, 75, 464/89, 902

(56) References Cited

U.S. PATENT DOCUMENTS

| | | |
|---|---|---|
| 1,803,937 * | 5/1931 | Jansson .............................. 464/75 X |
| 2,444,904 | 7/1948 | Worley . |
| 2,504,750 | 4/1950 | Strachovsky . |
| 3,183,684 | 5/1965 | Zeidler . |
| 3,321,935 | 5/1967 | Wildhaber . |
| 3,620,043 | 11/1971 | Gantschnigg . |
| 4,050,266 | 9/1977 | Bergman . |
| 4,194,373 | 3/1980 | Jennings et al. . |
| 4,240,763 | 12/1980 | Moore . |
| 4,445,606 * | 5/1984 | Van Laningham ................. 464/75 X |
| 4,452,591 * | 6/1984 | Fishbaugh et al. ..................... 464/89 |
| 4,477,225 * | 10/1984 | Burkam ............................... 464/74 X |
| 4,667,530 | 5/1987 | Mettler et al. . |
| 4,913,671 | 4/1990 | Gavriles et al. . |
| 5,052,991 * | 10/1991 | Yamaguchi et al. ................. 475/344 |
| 5,085,289 | 2/1992 | Chance . |
| 5,129,797 * | 7/1992 | Kanamaru ....................... 464/904 X |
| 5,435,784 | 7/1995 | Mark . |
| 5,564,981 | 10/1996 | Iwabuchi et al. . |
| 5,573,462 | 11/1996 | Sweeney et al. . |
| 5,677,007 | 10/1997 | Tsai . |

FOREIGN PATENT DOCUMENTS

3435469 A1  4/1985 (DE) .

OTHER PUBLICATIONS

Lord Corporation, Chemical Products, Product Information, *Chemglaze* Z320A/B, DS10–7181, 6/97.
Lord Corporation, Elastomer Products, Product Information, *Chemlok®* 252X, DS10–2052D, 12/94.
Lord Corporation, Mechanical Products, *Engineering Guide and Catalog for Vibration, Shock and Noise Control Products, For Industrial Applications*, 3/96–15M, pp 109–118.

* cited by examiner

Primary Examiner—Lynne H. Browne
Assistant Examiner—Greg Binda
(74) *Attorney, Agent, or Firm*—Michael M. Gnibus; Randall S. Wayland

(57) ABSTRACT

An elastomer coupling (20) including an outer member (40) including a leading contact face (38), and an elastomer component (30) including a driving elastomer contact face (41) opposing and adapted for operable unbonded contact with said leading contact face (38), the driving elastomer contact face (41) including a thin polyurethane coating (50). In another aspect, the elastomer coupling (20) has an elastomer member (30) preferably having a plurality of parallel-sided bonded lugs (47) having thin elastomer driving and following skins (46, 46') received in preferable line fit relationship in a plurality of parallel-sided recesses (44) formed in a preferably plastic outer member (40) for transmitting torques, accommodating slight parallel and angular misaligninents, and isolating vibrations thereof.

23 Claims, 4 Drawing Sheets

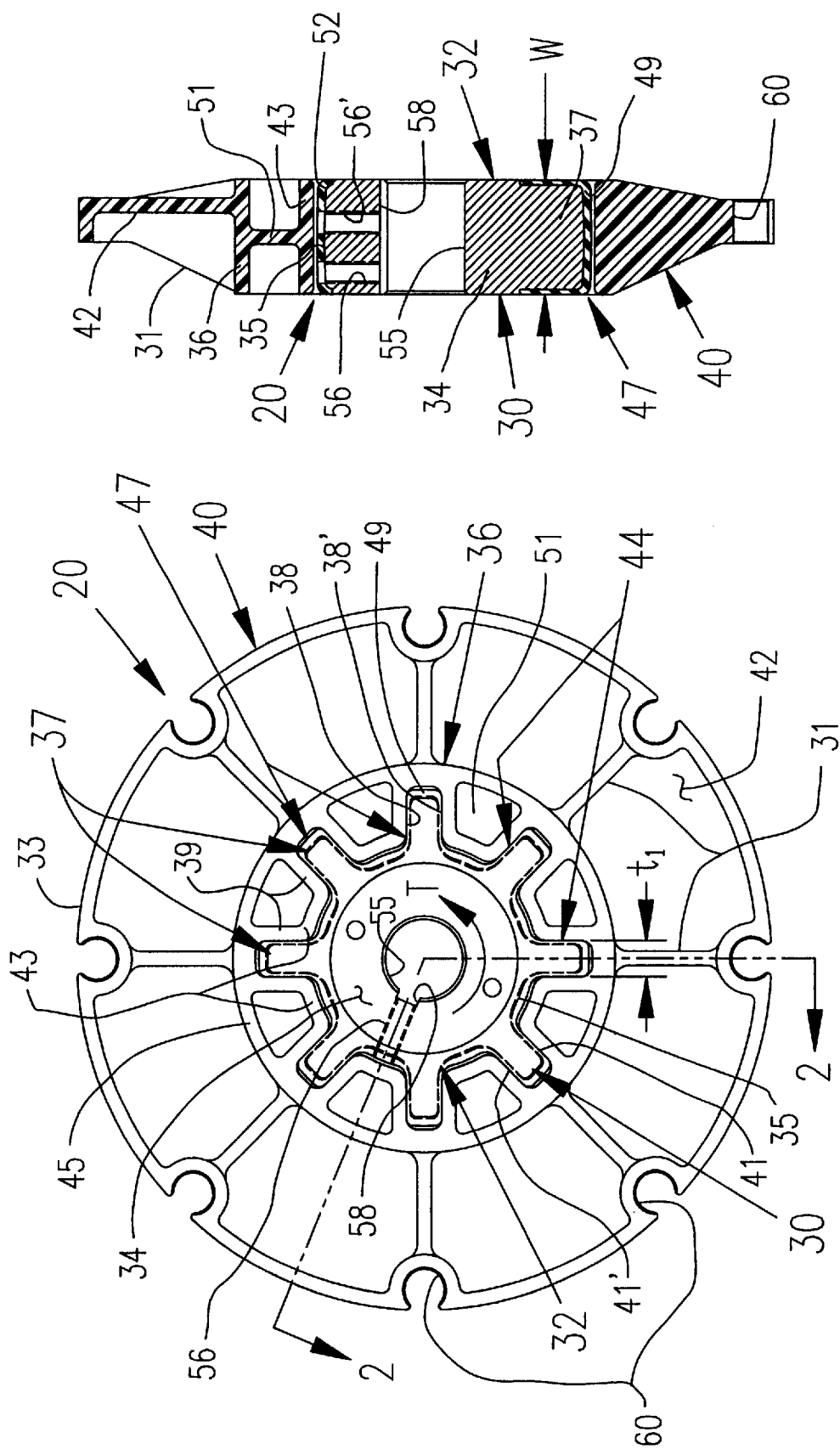

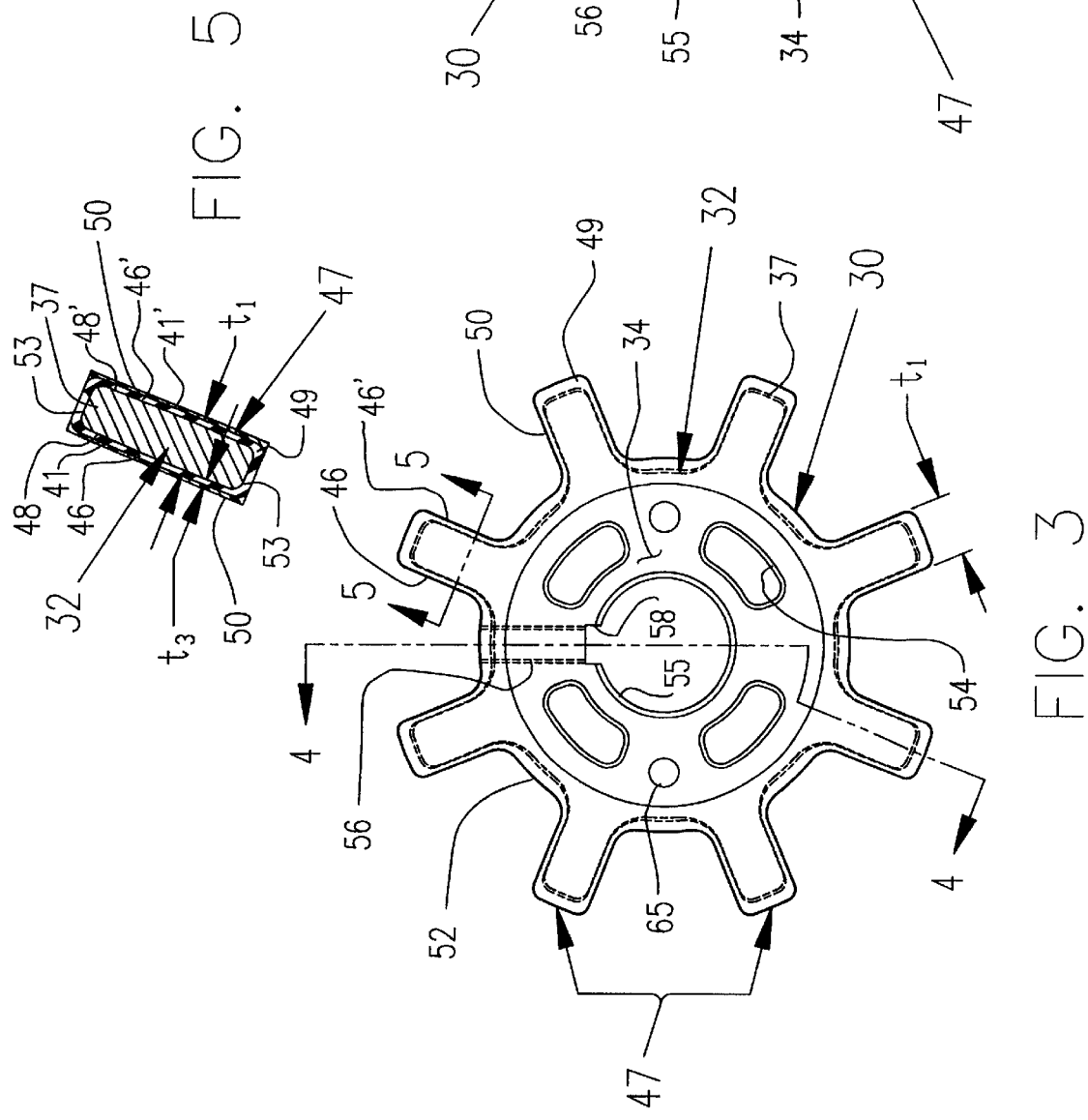
FIG. 3
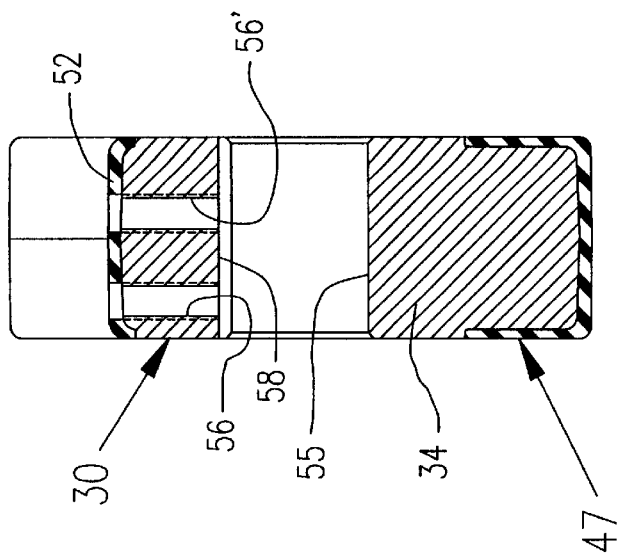
FIG. 5
FIG. 4

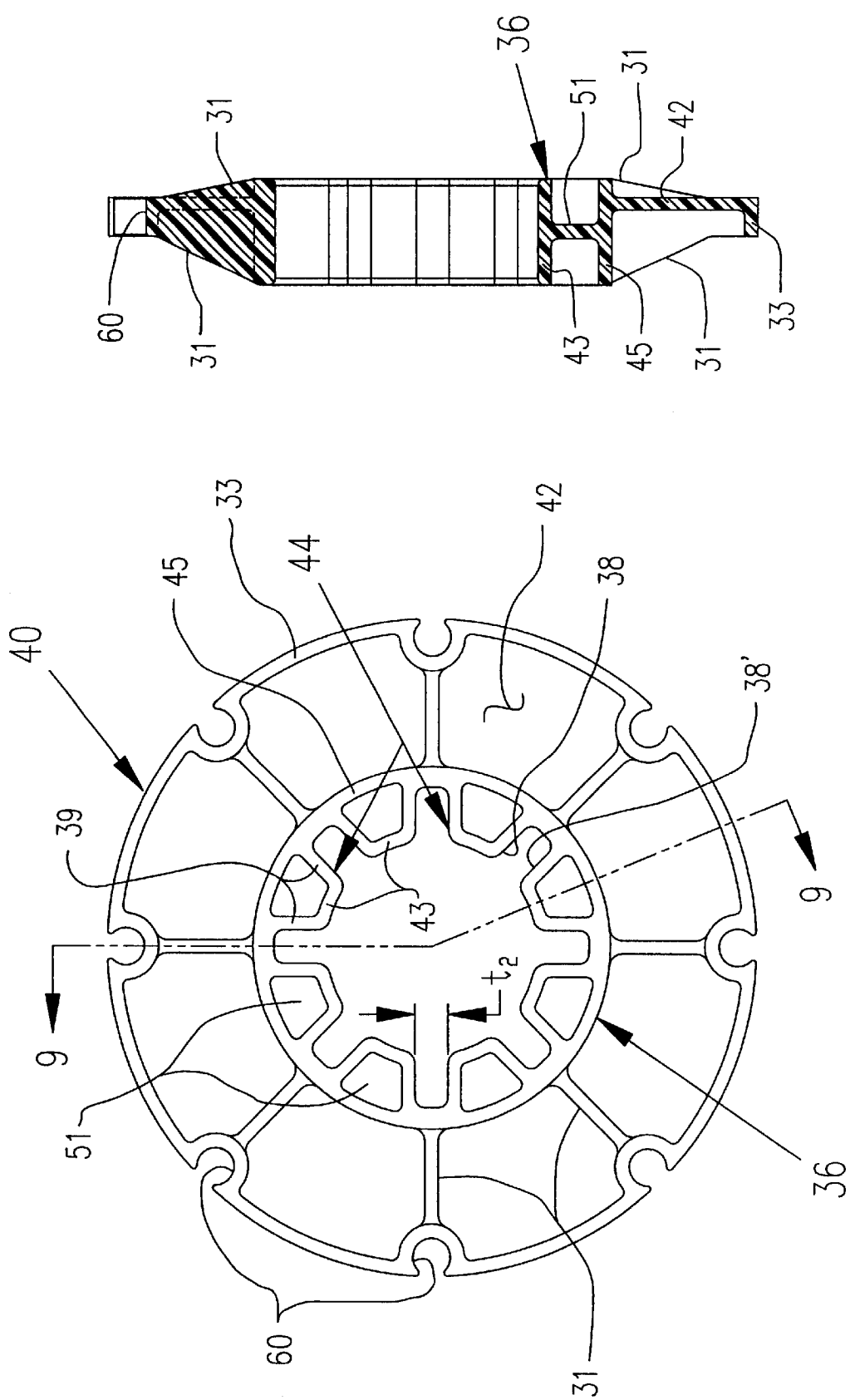

ELASTOMERIC COUPLING AND METHOD OF IMPROVING DURABILITY THEREOF

FIELD OF THE INVENTION

The invention relates to torsional couplings. More particularly, the present invention is directed to an elastomer coupling for use in a drive train.

BACKGROUND OF THE INVENTION

Elastomer drive couplings are transmission devices that connect between a driving member and a driven member, such as in a drive train, to provide misalignment accommodation, torque carrying capability and appropriate stiffness for vibration isolation. Couplings are used, for example, in a drive train between an engine and a unit to be rotated, such as a compressor. The torsional stiffness of the coupling is designed to minimize torsional vibrations that may cause damage to the drive train components.

Examples of prior art couplings can be found in U.S. Pat. No. 2,444,904 to Worley, U.S. Pat. No. 2,504,750 to Strachovsky, U.S. Pat. No. 4,050,266 to Bergman, U.S. Pat. No. 3,321,935 to Wildhaber, U.S. Pat. No. 3,183,684 to Zeidler, U.S. Pat. No. 4,240,763 to Moore, U.S. Pat. No. 4,913,671 to Gavriles and U.S. Pat. No. 5,435,784 to Mark.

Certain ones of these prior art couplings have general deficiencies in performance and/or durability. For example, in the spider coupling described in the '784 Mark patent, the rubber blocks 24 are not bonded to the inner member lugs 22, thus they do not effectively transfer loads to the outer member drive ring 10. Further, the rubber blocks 24 will have the tendency to abrade against the drive ring's trapezoidal openings 14 due to slight angular and/or parallel misalignment. As a result, the drive train including the Mark's '784 device must be torn down periodically in order to replace the rubber blocks 24. Accordingly there has been a long felt, and unmet need for a coupling capable of transmitting large torques, accommodating misalignments and which exhibits extended durability such that replacement intervals are decreased.

SUMMARY OF THE INVENTION

The present invention provides an elastomer coupling which includes a rigid outer member and an elastomer component cooperative therewith which exhibits excellent durability. The durability improvement is provided by adhering a thin polyurethane coating on an elastomer contact face of the elastomer component. According to the invention, the coupling includes an outer member having a leading contact face, an elastomer component including a driving elastomer contact face, where the elastomer contact face includes a thin polyurethane coating.

In a preferred aspect, the elastomer component includes a rigid inner member having a plurality of radially directed rigid spokes including thin elastomer bonded skins, thus forming a plurality of bonded lugs. Each of the lugs preferably includes parallel surfaces formed thereon. The outer member, which is preferably plastic, includes a plurality of radial recesses formed therein, each including a leading contact face and an opposing trailing contact face. The plurality of bonded lugs are received, preferably in a line fit relationship within the recesses thereby accommodating slight angular and parallel misalignments, yet providing the ability to carry significant torque loads. The inventors herein determined that the durability of the skins on the bonded lugs is dramatically improved by adding the polyurethane coating. Moreover, the coating has the benefit of minimizing lubrication throw-off, such as is experienced on prior art couplings utilizing grease or oil lubrication.

In accordance with another aspect of the invention, an elastomer coupling is provided which comprises an outer member including a thin flange radially extending from a thicker central section, the thicker central section including a plurality of recesses formed therein each having leading and trailing contact faces, each of said plurality of recesses having a thickness dimension, and an elastomer component having an inner member with a hub including a radially peripheral surface and a plurality of radially directed spokes emanating therefrom, the spokes including preferably parallel surfaces formed thereon, driving and following thin elastomer skins of substantially constant thickness bonded to said parallel surfaces thus forming a plurality of bonded lugs each including driving and following contact faces and having a thickness dimension being substantially equal to said comparable dimension of the recesses such that the plurality of bonded lugs are preferably received in said plurality of recesses in close (line) fit relationship, and preferably a friction reducing polyurethane coating applied at least to the contact surfaces of the plurality of bonded lugs.

In accordance with another aspect, a coupling is provided which comprises an outer member including a thin flange radially extending from a thicker central section, said central section including a plurality of recesses formed radially therein each having preferably parallel leading and trailing contact faces, each said recess having a thickness dimension, and a bonded component including an inner member having a hub including a radially peripheral surface and a plurality of radially directed spokes emanating therefrom, the spokes preferably including parallel surfaces formed thereon, driving and following thin elastomer skins of preferably substantially constant thickness bonded to the parallel surfaces, thus forming a plurality of bonded lugs having a thickness dimension being preferably substantially equal to the thickness dimension of the recesses such that the plurality of bonded lugs are received in the plurality of recesses in preferable close (line) fit relationship.

In accordance with another aspect of the invention, a method is provided for improving the durability of an elastomer coupling, comprising the steps of providing a first member including a first contact face, providing an elastomer component including an elastomer contact face opposing and adapted for operable contact and movement relative to the first contact face, and applying a thin polyurethane coating to said elastomer contact face. Preferably, the coating is applied over a suitable adhesive and processed according to a method prescribed herein.

The coupling advantageously provides improved durability as compared to prior art couplings.

Moreover, the coupling advantageously provides high torque carrying capacity while exhibiting light weight.

Moreover, the coupling advantageously provides minimal debris throw-off during rotation.

The above-mentioned and further features, advantages, and characteristics of the present invention will become apparent from the accompanying descriptions of the preferred embodiments and attached drawings.

BRIEF DESCRIPTION OF THE DRAWINGS

The invention will become better understood by reference to the description that follows, in conjunction with the appended drawings, in which:

FIG. 1 is a frontal view of an elastomer coupling in accordance with the present invention;

FIG. 2 is a sectioned side view of the coupling of FIG. 1 taken along line 2—2;

FIG. 3 is a frontal view of the elastomer component in accordance with the present invention;

FIG. 4 is a sectioned side view of the elastomer component of FIG. 3 taken along line 4—4;

FIG. 5 is a sectioned end view of a bonded lug of the elastomer component of FIG. 3 taken along line 5—5;

FIG. 8 is a frontal view of the outer member in accordance with the present invention; and FIG. 9 is a sectioned side view of the outer member of FIG. 8 taken along line 9—9.

DETAILED DESCRIPTION OF THE PREFERRED EMBODIMENT

Figure 7:
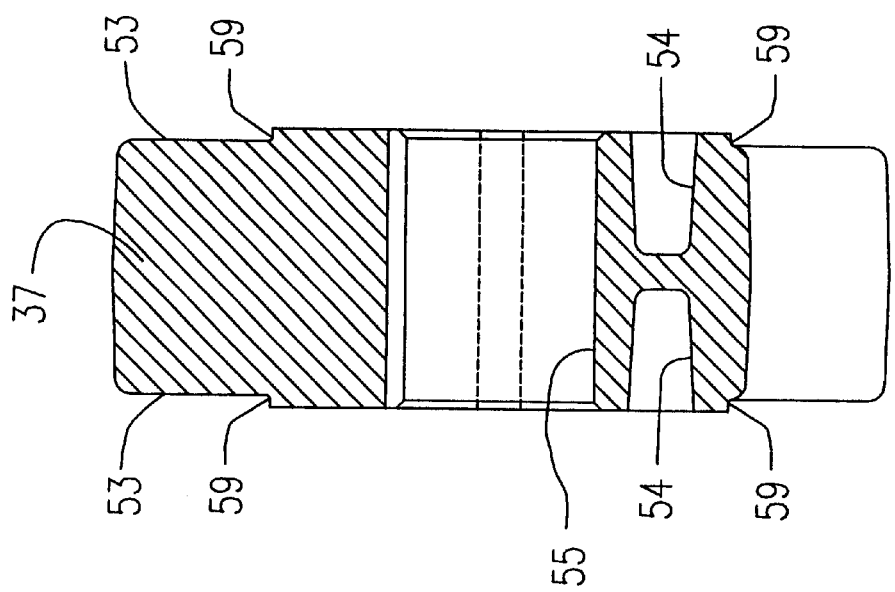
FIG. 7 is a sectioned side view of the inner member of FIG. 6 taken along the line 7—7.

An elastomeric coupling 20 according to the invention is first illustrated in FIGS. 1 and 2. This type of coupling 20, generally referred to as a spider coupling, provides a very high torsional stiffness, generally in excess of about 100,000 lbf-in./radian (11,300 N-m/radian). The coupling 20 in accordance with the present invention includes an outer member 40 and an elastomer component 30 inserted in close (line) fit relationship therein. Preferably, the elastomer component 30 is coated to extend its durability, as will be described later herein. As best shown in FIGS. 1–2 and 8–9, the rigid outer member 40 preferably includes a thin flange 42 extending radially outward from a thicker central section 36 and to preferably intersect an outer circumferential rim 33. The central section 36 includes a plurality of equally-spaced recesses 44, each extending in a radial direction and preferably including substantially parallel leading 38 and trailing 38' contact faces. A plurality of radially extending tapered stiffening ribs 31 extend radially from the central section 36 and thinning down towards the outer rim 33 and provide enhanced rigidity to the preferably plastic outer member 40.

The central section 36 also includes radially extending recess ribs 39 upon which the contact faces 38, 38' are formed, tangentially extending recess ribs 43, and an inner rim 45 which completely surrounds the recesses 44. Each tangentially extending recess rib 43 attaches between respective ones of the at the inboard ends of radially extending recess ribs 39 to stiffen same. Likewise, the inner cylindrical rim 45 attaches to each of the radially extending recess ribs 39 at their outboard ends to add additional strength. Thin planar ribs 51 provide additional structural radial support between the tangential rib 43, radial ribs 39 and inner rim 45, further strengthening the outer member 40 adjacent to the recesses 44. In an outer member 40 also includes a plurality of blind attachment holes 60 around the outer rim 33 for securing to the drive train component (not shown). Blind holes 60 provide for ease of assembly of attachment bolts (not shown). The recesses 44 preferably includes a pocket cross dimension $t_2$ which is substantially equal to the lug thickness $t_1$ of the bonded lug 47 (FIG. 5) such that a preferable close fit is accomplished. The preferred close fit that is accomplished is a conventional line-to-line fit well known in the relevant art. The line fit is desired to minimize backlash in the coupling as zero torque is encountered.

A line fit relationship means that the dimensions of the lugs 47 are such that in the theoretical case, the lug faces 41, 41' are just in contact with the recess faces 38, 38'. However, it should be understood that, in reality, tolerance stack ups may provide for a very slight gap or a very slight squeeze fit. The preferable material for the manufacture of the outer member 40 is plastic, such as RYNITE 530 manufactured by Dupont. This dramatically minimizes the weight of the coupling. It should be understood that reducing the rotational inertia of the drive line is desirable. However, other suitable plastic materials could be used as well. A smooth finish on the leading and trailing edges 38, 38' is most desirable. As discussed hereinbefore, the faces 41, 41' are preferably parallel and the recess faces 38, 38' are also preferably parallel. This ensures that during torque transmission, that radial forces are minimized to the plastic outer member 40 which may be detrimental to its durability.

Figure 6:
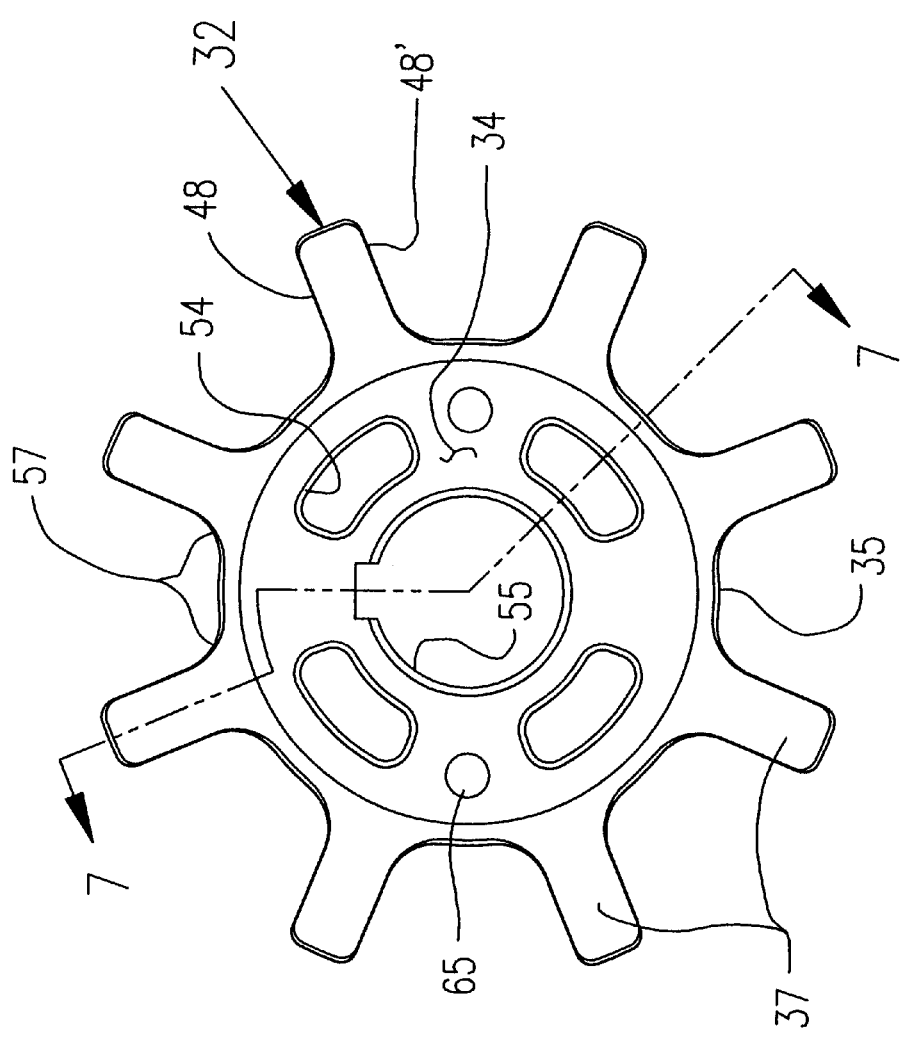
FIG. 6 is a frontal view of the inner member in accordance with the present invention.

As best shown in FIGS. 3–7, the elastomer component 30 preferably includes a rigid, preferably cast iron, inner member 32 having a cylindrical hub 34 including a radially peripheral surface 35 and axially cored-out portions 54. Cored-out portions 54 reduce the weight of the hub 34. A plurality of thin, equally-spaced, radially directed rigid spokes 37 emanate from the hub 34. A central axial through bore 55 is provided for attachment to a drive shaft (not shown). Generous radii 57 are applied at the base of each spoke 37 to reduce stress concentrations. Moreover, steps 59 are provided for ensuring a generous skin of elastomer on the axial edges 53 of spokes 37. Holes 65 may be included for orientation in the mold during bonding. Elastomer 49, such as a natural rubber, a natural rubber blend or other suitable elastomer material, is integrally bonded to leading and trailing spoke surfaces 48, 48' of the spokes 37 of inner member 32 as best shown in FIGS. 3–5. This forms the plurality of bonded lugs 47. The leading contact faces 41 of the elastomer component 30 cooperate with the leading contact faces 38 of the outer member 40 to carry the torque T.

Preferably the elastomer 49 used in the elastomer component 30 exhibits a durometer of between about 45 and 75 durometer, Shore A, and more preferably about 56–60 Shore A. During the vulcanization/bonding operation, a plurality of elastomer skins 46, 46' of substantially constant thickness $t_3$ are vulcanized bonded to the leading and trailing surfaces 48, 48' via a transfer or injection molding operation. Moreover, the elastomer 49 at the axial edges of spokes 37 is also preferably bonded to the spokes 37. Additionally, a thin tangential skin 52 of elastomer 49 is preferably also bonded to the radially peripheral surface 35 of the inner member 32. The tangential skin 52 interconnects the elastomer skins 46 and 46' bonded to the leading and trailing surfaces 48 and 48' of spokes 37. The overall thickness of the bonded lugs 47 is designated $t_1$. The thickness of each lug is substantially constant. Notably, the width w of the bonded lugs 47 are at least 2 times their thickness $t_1$. This provides substantial load carrying area such that the elastomer skin 46 or spoke 37 is not overstressed.

By way of example, and not to be considered limiting, the thickness of the driving and following skins 46, 46' are between 0.04 inch (1.02 mm) and 0.2 inch (5.08 mm) and most preferably about 0.125 inch (3.18 mm). The bonded component 30 includes an axial through bore 55 which interconnects to a power transmission shaft (not shown). Axially extending broached key way 58 accepts key (not shown) to prevent rotation of the bonded elastomer component 30 relative to the drive shaft (not shown). Two threaded holes 56 and 56' which are radially formed in the hub 34 after the bonding operation accept set screws (not shown) to secure the component 30 to the shaft (not shown). The threaded holes intersect the keyway 58 so that the set screws are permitted to pass through the holes until the ends of the screws contact the key. In this way, the key is maintained in the keyway during use of the coupling.

Applied to and adhered at least on the driving elastomer contact face 41 of the plurality of driving elastomer skins 46 on lugs 47, and more preferably on all elastomer contact surfaces 41, 41' of elastomer 49, is a friction-reducing thin polyurethane coating 50. This polyurethane coating 50 is preferably applied over a suitable adhesive applied to the driving and following elastomer contact faces 41, 41'. By way of example, and not to be considered limiting, the preferable coating is a CHEMGLAZE® Z320A/B system which is a two-component, high performance polyurethane slip coating available from Lord Corporation of Erie, Pa. The coating is preferably applied over a halogenated polyolefin containing adhesive, such as CHEMLOK® 252X High Performance One-Coat Adhesive, also available from Lord Corporation. First, the exposed elastomer surfaces of the elastomer component 30 are solvent wiped, such as with Methyl Ethyl Ketone (MEK) and allowed to dry. Next, CHEMLOK® 252X is sprayed onto the elastomer component 30 at approximately 0.5 mils (0.0127 mm) dry film thickness. The elastomer component 30 is then oven cured for 5 minutes at approximately 300 degrees F. (148 degrees C.). A spray coating of polyurethane coating CHEMGLAZE® Z320A/B is then applied to the primed components 30 at approximately 1.2 mils (0.0305 mm) dry film thickness. Finally, the coated component 30 is oven cured for an additional 10 minutes at 300 degrees F. (148 degrees C.). It was determined by the inventors that coating the driving elastomer contact face 41 of the elastomer component 30 with this polyurethane coating dramatically enhanced its durability. The coating is found to be particularly effective in the spider coupling 20 in accordance with another aspect of the invention. Moreover, the use of the coating appears to be particularly advantageous when the elastomer component 30 is used with a plastic outer member 40.

The invention has been described in terms of preferred method steps and structure, however, the particular examples given are meant to be illustrative and not limiting. Substitutions and equivalents as will occur to those skilled in the art are included within the scope of the invention as defined by the following claims.

What is claimed is:

1. A coupling, comprising:
   (a) an outer member including at least one recess, the at least one recess having a leading contact face, and an opposing trailing contact face, the leading and trailing faces being formed upon radially extending recess ribs having inboard and outboard ends and the recess ribs being joined at the outboard ends by an inner cylindrical rim;
   (b) an elastomer component inducing a driving elastomer contact face opposing and adapted for operable unbonded contact with said leading contact face; and
   (c) a polyurethane coating included on said driving elastomer contact face.

2. The coupling of claim 1 wherein said elastomer component further comprises:
   a rigid inner member having a hub and a plurality of radially directed rigid spokes extending therefrom and an elastomer skin being bonded to spoke surfaces of said spokes thus forming bonded lugs having a plurality of driving elastomer skins, each said lug including a driving elastomer contact face.

3. The coupling of claim 2 wherein said outer member further includes a flange radially extending from a thicker central section, the outer member including a plurality of recesses located in said central section.

4. The coupling of claim 2 wherein each lug includes a following elastomer contact face, said driving elastomer contact face and said following elastomer contact face formed on driving and following surfaces of each of said plurality of radially directed spokes are parallel.

5. The coupling of claim 2 wherein the spokes include spoke surfaces, and wherein said elastomer skin is bonded to the spoke surfaces and said plurality of elastomer skins have a substantially constant thickness along a radial dimension of said spokes.

6. The coupling of claim 2 wherein the outer member includes a plurality of recesses, a thickness of said plurality of bonded lugs is substantially equal to a receiving dimension of said plurality of recesses such that said plurality of bonded lugs fit said plurality of recesses in close fit relationship.

7. The coupling of claim 2 wherein a driving elastomer skin of a first lug is interconnected to a following skin of an adjacent lug through an interconnecting tangential skin.

8. The coupling of claim 2 wherein said outer member is plastic.

9. A coupling, comprising:
   (a) a plastic outer member including a flange radially extending from a central section to an outer rim, a plurality of stiffening ribs extending between said central section and said rim, said central section including a plurality of recesses formed radially therein each having parallel leading and trailing contact faces, each said recess having a thickness dimension,
   (b) a bonded component, including;
       (i) an inner member having a hub including a radially peripheral surface and a plurality of radially directed spokes emanating therefrom, said spokes including parallel surfaces formed thereon, and
       (ii) driving and following elastomer skins of substantially constant thickness bonded to said surfaces thus forming a plurality of bonded lugs having a substantially constant thickness dimension being substantially equal to said dimension of said recesses such that said lugs are received in said recesses in close fit relationship.

10. A coupling, comprising:
    (a) an outer member including a flange radially extending from a thicker central section, said central section including a plurality of recesses formed radially therein each having parallel leading and trailing contact faces, each said recess having a thickness dimension, the outer member further including a plurality of radially extending spaced apart recess ribs upon which the leading and trailing contact faces are formed, the recess ribs further including inboard and outboard ends; an inner rim that attaches to the recess ribs at the outboard ends and a plurality of tangential ribs each tangential rib joining adjacent recess ribs at the inboard ends of the adjacent recess ribs; and
    (b) a bonded component, including:
        (i) an inner member having a hub including a radially peripheral surface and a plurality of radially directed spokes emanating therefrom, said spokes including parallel surfaces formed thereon; and
        (ii) driving and following elastomer skins of substantially constant thickness bonded to said surfaces thus forming a plurality of bonded lugs having a substantially constant thickness dimension being substantially equal to the dimension of said recesses such that said lugs are received in said recesses in close fit relationship.

11. The coupling of claim 10 wherein a plurality of set screw receiving threaded holes are formed radially in said hub after bonding.

12. The coupling of claim 11 wherein a plurality of set screw receiving threaded holes are formed radially in said hub after bonding.

13. The coupling of claim 10 wherein said outer member is manufactured from plastic.

14. The coupling of claim 10 wherein said flange intersects an axially directed outer rim which extends circumerentially at least part way around an outermost periphery of said outer member.

15. The coupling of claim 10 wherein said outer member includes a plurality of radially spaced blind mounting holes.

16. The coupling of claim 10 wherein said flange extends outwardly from the inner rim.

17. The coupling of claim 10 wherein said plurality of bonded lugs includes a width dimension approximately twice the thickness dimension of each bonded lug.

18. The coupling of claim 10 wherein said driving elastomer skin includes a polyurethane coating.

19. The coupling of claim 10 wherein said hub includes cored-out portions.

20. The coupling as claimed in claim 10 wherein each pair of adjacent recess ribs, the tangential rib joining the adjacent recess ribs and the inner rim are joined by a planar rib.

21. The coupling as claimed in claim 10 wherein each spoke includes an axial edge with a step formed on the axial edge.

22. An elastomer coupling, comprising:
(a) an outer member including a flange radially extending from a central section, said central section including a plurality of recesses formed therein each having leading and trailing contact faces, each of said plurality of recesses having a thickness dimension; the outer member further including a plurality of radially extending spaced apart recess ribs upon which the leading and trailing contact faces are formed, the recess ribs further including inboard and outboard ends; an inner rim that attaches to the recess ribs at the outboard ends and a plurality of tangential ribs each tangential rib joining adjacent recess ribs at the inboard ends of the adjacent recess ribs, the recess ribs, tangential ribs and inner rim defining the plurality of recesses; and (b) an elastomer component, including;
(i) an inner member having a hub including a radially peripheral surface and a plurality of radially directed spokes emanating therefrom, said spokes including parallel surfaces formed thereon;
(ii) driving and following elastomer skins of substantially constant thickness bonded to said parallel surfaces thus forming a plurality of bonded lugs having a substantially constant thickness dimension being substantially equal to said dimension of said recesses such that the plurality of bonded lugs are received in said plurality of recesses in close fit relation the driving and following elastomer skins defining driving and following elastomer contact surfaces; and
(iii) a polyurethane coating applied to said driving elastomer contact surfaces of said plurality of bonded lugs.

23. The coupling as claimed in claim 22 wherein each pair of adjacent recess ribs, the tangential rib joining the adjacent ribs and the inner rim are joined by a planar rib.

* * * * *